United States Patent
Schwindt

(10) Patent No.: US 11,480,689 B2
(45) Date of Patent: Oct. 25, 2022

(54) DETECTING THE SPOOFING OF A SIGNAL

(71) Applicant: GE Aviation Systems Limited, Cheltenham (GB)

(72) Inventor: Stefan Alexander Schwindt, Cheltenham (GB)

(73) Assignee: GE Aviation Systems Limited, Gloucestershire (GB)

( * ) Notice: Subject to any disclaimer, the term of this patent is extended or adjusted under 35 U.S.C. 154(b) by 157 days.

(21) Appl. No.: 16/681,318

(22) Filed: Nov. 12, 2019

(65) Prior Publication Data

US 2020/0241147 A1 Jul. 30, 2020

(30) Foreign Application Priority Data

Nov. 14, 2018 (GB) ...................................... 1818570

(51) Int. Cl.
*G01S 19/21* (2010.01)
*G01S 19/24* (2010.01)
*G01S 19/29* (2010.01)

(52) U.S. Cl.
CPC ............ *G01S 19/215* (2013.01); *G01S 19/21* (2013.01); *G01S 19/246* (2013.01); *G01S 19/29* (2013.01)

(58) Field of Classification Search
CPC ...... G01S 19/215; G01S 19/21; G01S 19/246; G01S 19/29
USPC ............................... 342/352, 357.59, 357.68
See application file for complete search history.

(56) References Cited

U.S. PATENT DOCUMENTS

| | | | |
|---|---|---|---|
| 5,323,322 A | 6/1994 | Mueller et al. | |
| 5,995,042 A * | 11/1999 | Durboraw, III | ....... G01S 19/215 342/357.58 |
| 7,471,238 B2 * | 12/2008 | Lillo | ...................... G01S 19/21 342/357.59 |
| 7,512,492 B2 * | 3/2009 | Irvin | ...................... G01S 19/21 701/473 |
| 7,952,519 B1 | 5/2011 | Nielsen et al. | |
| 8,138,975 B2 | 3/2012 | Bull et al. | |
| 8,531,332 B2 * | 9/2013 | Gum | ..................... G01S 19/215 342/357.73 |
| 9,217,792 B2 | 12/2015 | Wu | |
| 9,523,774 B2 * | 12/2016 | Davies | .................. G01S 19/215 |
| 9,689,989 B2 | 6/2017 | Trautenberg et al. | |
| 10,024,973 B1 * | 7/2018 | Alexander | ............ G01S 19/215 |

(Continued)

FOREIGN PATENT DOCUMENTS

| EP | 3002610 A2 | 4/2016 |
|---|---|---|
| EP | 2455781 B1 | 5/2017 |

(Continued)

OTHER PUBLICATIONS

European Patent Office, Combined Search and Examination Report under Sections 17 and 18(3) re Corresponding Application No. GB1818570.2, dated May 14, 2019, 5 page, South Wales, NP.

(Continued)

*Primary Examiner* — Chuong P Nguyen
(74) *Attorney, Agent, or Firm* — McGarry Bair PC

(57) ABSTRACT

A method for detecting the spoofing of a signal from a satellite in orbit. A receiver can be located on an aircraft to receive an apparent satellite signal. The method can include determining at least two characteristic signatures of the signal including a power level, and indicating the apparent satellite signal is a spoofed satellite signal.

20 Claims, 3 Drawing Sheets

(56) References Cited

U.S. PATENT DOCUMENTS

| | | | | |
|---|---|---|---|---|
| 10,120,080 B2* | 11/2018 | Davies | ............. | G01S 19/215 |
| 10,466,700 B1* | 11/2019 | Carmack | ............. | H04K 3/224 |
| 10,545,246 B1* | 1/2020 | Johnston | ............. | G01S 19/21 |
| 10,908,293 B2* | 2/2021 | Whitehead | ............. | G01S 19/215 |
| 10,948,602 B1* | 3/2021 | Alexander | ............. | G01S 19/215 |
| 10,983,220 B2* | 4/2021 | Ashjaee | ............. | G01S 19/28 |
| 11,215,714 B2* | 1/2022 | Sasaki | ............. | H04K 3/228 |
| 2003/0114983 A1* | 6/2003 | Irvin | ............. | G01S 19/21 |
| | | | | 701/473 |
| 2007/0001898 A1 | 1/2007 | Twitchell, Jr. et al. | | |
| 2013/0002477 A1* | 1/2013 | Dehnie | ............. | G01S 19/215 |
| | | | | 342/357.3 |
| 2013/0271316 A1* | 10/2013 | Trautenberg | ............. | G01S 19/215 |
| | | | | 342/357.59 |
| 2014/0247186 A1* | 9/2014 | Daneshmand | ............. | G01S 19/215 |
| | | | | 342/357.59 |
| 2015/0048973 A1* | 2/2015 | Whitehead | ............. | H04K 3/90 |
| | | | | 342/357.58 |
| 2016/0195618 A1 | 7/2016 | Baer et al. | | |
| 2016/0377726 A1 | 12/2016 | Schipper et al. | | |
| 2017/0215045 A1 | 7/2017 | Rasal et al. | | |
| 2017/0369183 A1 | 12/2017 | Tarimala et al. | | |
| 2018/0302148 A1 | 10/2018 | Goeizelmann et al. | | |
| 2019/0235086 A1* | 8/2019 | Meng | ............. | G05D 1/0061 |
| 2019/0361130 A1* | 11/2019 | Leibner | ............. | G01S 19/215 |
| 2020/0371246 A1* | 11/2020 | Marmet | ............. | G01S 5/0009 |
| 2021/0255331 A1* | 8/2021 | Broumandan | ............. | G01S 19/37 |
| 2021/0333411 A1* | 10/2021 | Gum | ............. | G01S 19/485 |

FOREIGN PATENT DOCUMENTS

| | | |
|---|---|---|
| WO | 2015077650 A1 | 5/2015 |
| WO | 2018125317 A2 | 7/2018 |
| WO | 2018193487 A1 | 10/2018 |

OTHER PUBLICATIONS

Aanjhan Ranganathan et al., "SPREE: Spoofing Resistant GPS Receiver", ARXIV.org, Cornell University Library, 201 Olin Library Cornell University, Ithaca, NY, Mar. 17, 2016, 14 pages, Zurich, Switzerland.

European Patent Office, European Search Report re Corresponding Application No. 19206681.9-1206, dated May 8, 2020, 12 pages, Munich, Germany.

* cited by examiner

DETECTING THE SPOOFING OF A SIGNAL

CROSS REFERENCE TO RELATED APPLICATION

This application claims priority to and benefit of GB Patent Application No. 1818570.2 filed Nov. 14, 2018, which is incorporated herein in its entirety.

TECHNICAL FIELD

The disclosure relates to a method for detecting the spoofing of a signal from a satellite in orbit, and more specifically to comparing a characteristic signature to a transmission data value.

BACKGROUND

In general, satellite-based communication and navigation systems provide location and time information for nautical, aeronautical, locomotive, and automotive vessels. Satellite communication and navigation systems can occur anywhere on or near the Earth where there is an unobstructed line of sight between the vessel and one or more satellites. Satellite communication and navigation systems have a variety of applications on land, at sea, and in the air.

Aircraft rely on satellite communication for navigation and information (e.g., weather) systems. Spoofing occurs when a signal is sent to the aircraft to intentionally feed misinformation to the navigation and information systems of the aircraft. For example, a spoofed satellite navigation signal may attempt to cause an aircraft to fly off course. An ability to authenticate satellite signals protects against spoofing. Some techniques to authenticate satellite signals may rely on unique characteristics of the signals, and therefore cannot be applied to all satellite signals.

BRIEF DESCRIPTION

In one aspect the disclosure relates to a method for detecting the spoofing of a signal from a satellite in orbit, the method comprising receiving by a receiver an apparent satellite signal, determining at least two characteristic signatures of the signal including a power level, comparing the at least two characteristic signatures to a current transmission data value to define a difference value, and indicating the apparent satellite signal is a spoofed satellite signal when the difference value is outside a predetermined tolerance value.

In another aspect, a method for detecting the spoofing of a signal from a satellite in orbit to a receiver on an aircraft, the method comprising receiving by the receiver an apparent satellite signal, determining at least two characteristic signatures of the signal including a power level, comparing the at least two characteristic signatures to a current transmission data value to define a difference value, and indicating the apparent satellite signal is a spoofed satellite signal when the difference value is outside a predetermined tolerance value.

DETAILED DESCRIPTION

The present disclosure is related to a method for detecting the spoofing of a signal from a satellite in orbit. The method as described herein is related to utilizing existing hardware of the satellite in orbit to make a determination based on information gleaned from the existing hardware as to whether a signal received at a receiver is a true satellite signal, or a spoofing signal. While this description is primarily directed towards use on an aircraft, it is also applicable to any vehicle or environment which would utilize a spoofing detecting method as a satellite navigational aid.

Figure 1:
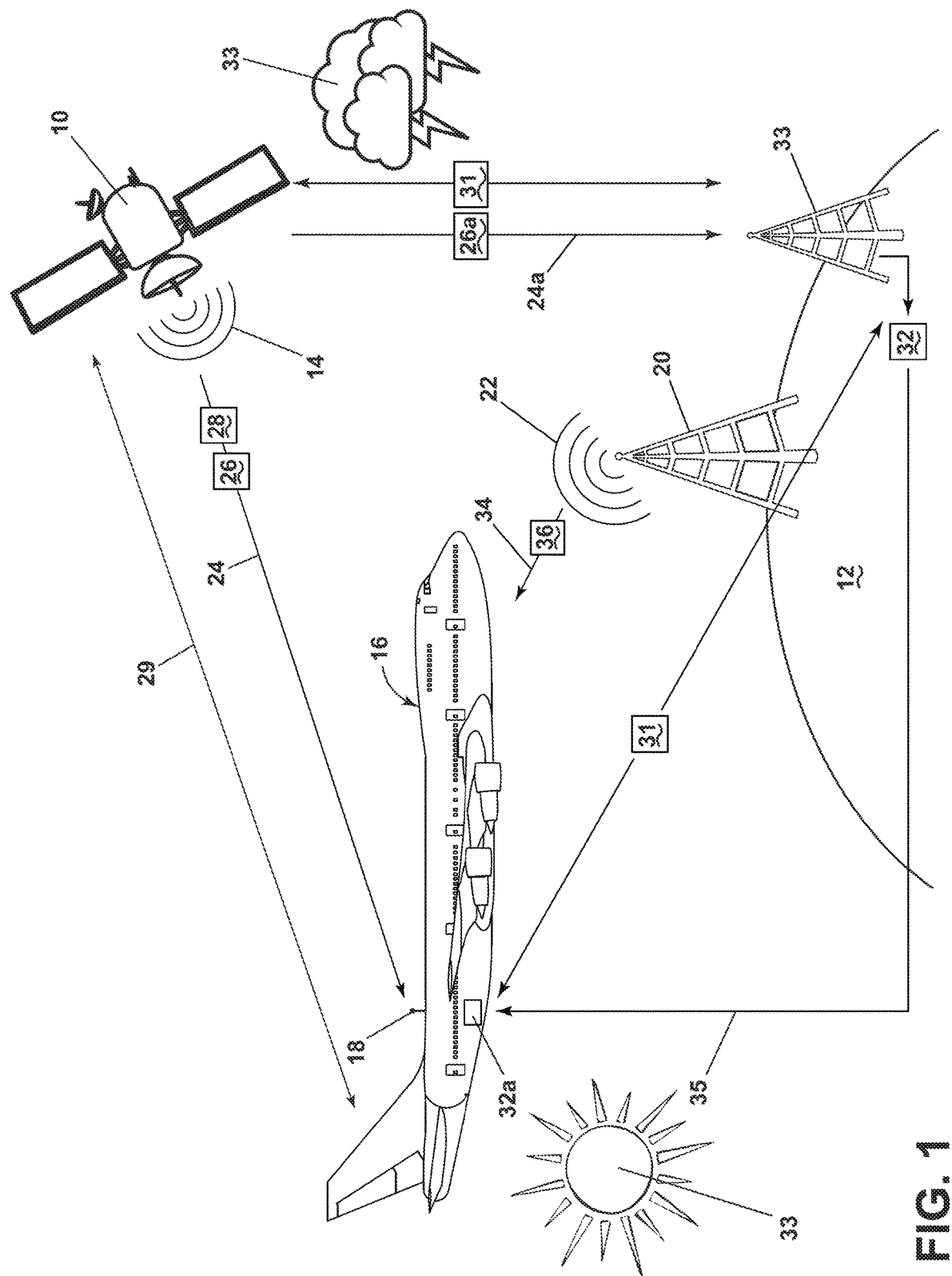
FIG. 1 is a diagram of an aircraft in flight capable of receiving radio signals from a satellite or other source.

FIG. 1 illustrates a satellite 10 in orbit around the earth 12. The satellite 10 emits a satellite signal 14. The satellite 10 can be any type of satellite, including but not limited to Geostationary satellites, Galileo satellites, COMPASS MEO satellites, GPS satellites, GLONASS satellites, NAVIC satellites, QZSS satellites or BeiDou-2 satellites. An aircraft 16 is illustrated in flight. The aircraft 16 can include a receiver, by way of non-limiting example a radio antenna 18, for receiving the satellite signal 14 from the satellite 10. A spoofing signal source 20 located on earth 12 can emit a spoofed satellite signal 22. While illustrated as located on earth 12, it is contemplated that a spoofing signal source 20 can be located elsewhere, including but not limited to another satellite in orbit.

At least two characteristic signatures 24, including a power level 26 and a secondary characteristic 28, 30, are associated with the satellite signal 14. As used herein, the term "characteristic signature" is simply a term used to cover any characteristic associated with the signal received. It is not to be confused with the known term "digital signature" which can reference a cryptographic or mathematical way to verify that a document hasn't been tampered with during transit between sender and signer. It is contemplated, however, that a digital signature can be the secondary characteristic 28, 30 of the satellite signal 14 in addition to the power level 26.

A database 32 can be utilized for storing current transmission data values 24a associated with the satellite signal 14, which can include, but are not limited to, a current transmission power level 26a. The database 32 can be stored on a server as part of a network connected to the antenna 18. The database 32 can be updated continuously, depending on the specific implementation or a bandwidth constraint. Current transmission power levels 26a can be captured in real time which requires a constant data stream. In some implementations, by way of non-limiting example on an aircraft, the antenna 18 may not be capable of receiving a constant data transmission due to location or lack of equipment. If the current transmission power levels 26a do not fluctuate much over time, it is contemplated that the database 32 is updated hourly, daily, weekly, or even monthly.

It should be understood that the characteristic signatures 24 received at the antenna 18 and the current transmission data values 24a stored in the database 32 should be approximately equal, accounting for any tolerances. The current transmission data values 24a can therefore be compensated for with respect to atmospheric attenuation during transmission. The compensation can be a function of the secondary characteristic, by way of non-limiting example a corresponding satellite location 28, and further a function of a current distance 29 between the satellite 10 and the antenna 18. The characteristic signatures 24 are associated with the actual satellite signal 14 received at the antenna 18 while the current transmission data values 24a can be known transmission values continuously calculated, updated, and uploaded to the database 32 based on real-time locations of the satellite 10, or other known qualities of the satellite 10.

The current transmission data values 24a can either be derived by having the database 32 fed with current transmission data values 24a directly from the satellite 10. In a case where the data is not available directly from the satellite 10, other locations 33 which are not mobile, can measure the current transmission power levels 26a, by compensating for weather conditions 33 and distance 31. The receiver 18 on the aircraft 16 can then compensate for weather 33 and distance 31 to compare a received signal 35 to the expected characteristic signatures 24. In other words, the current transmission data values 24a can be received at other locations 33 or calculated based on known satellite data, uploaded to the database 32, and relayed to an onboard database 32a. A number of spoofed characteristic signatures 34 can be associated with the spoofed satellite signal 22. The spoofed characteristic signatures 34 associated with the spoofed satellite signal 22 can include, but are not limited to, a spoofed power level 36, a spoofed location 38, and a spoofed time 40.

Figure 2:
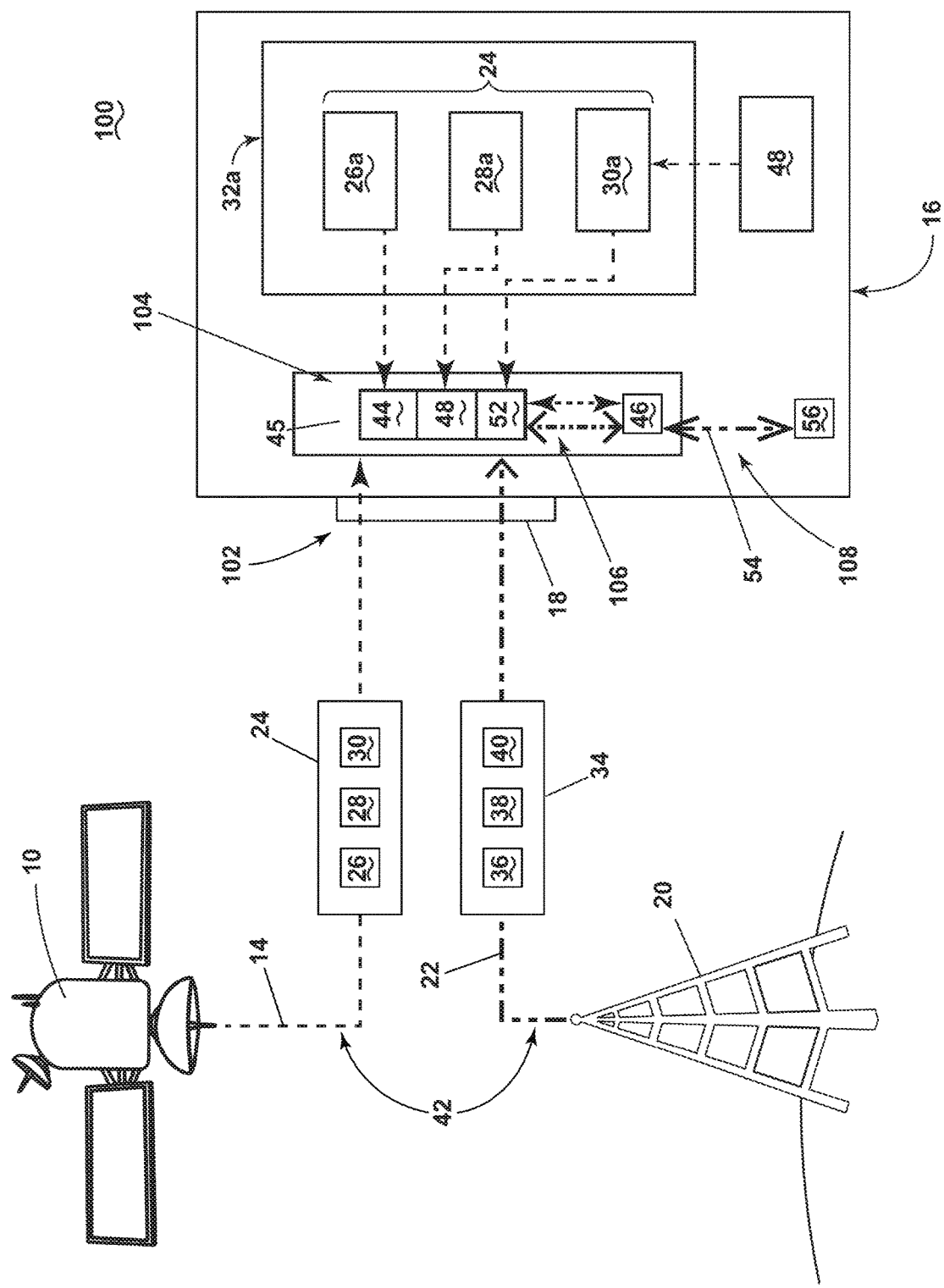
FIG. 2 is a block diagram illustrating a method for detecting a spoofing of a signal in detail.
Figure 3:
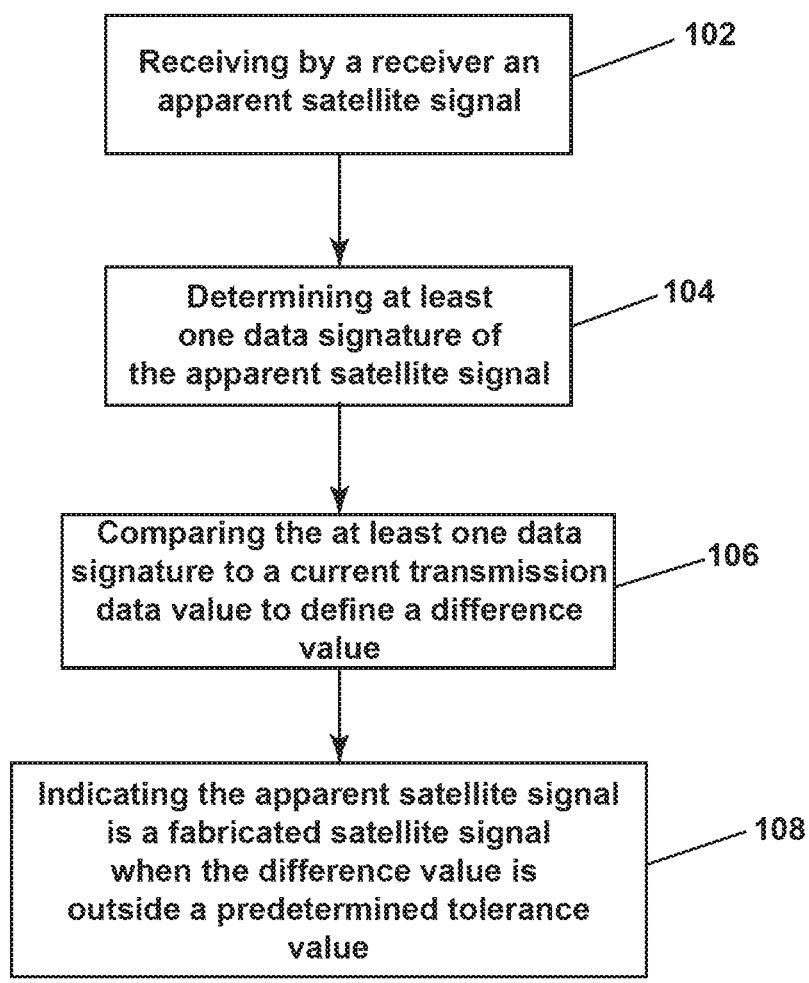
FIG. 3 is a flow diagram for a method of detecting the spoofing of a signal.

FIG. 2 illustrates a block diagram for a method 100 of detecting the spoofing of the satellite signal 14 from the satellite 10 in orbit. At 102 an apparent satellite signal 42 is received at the antenna 18. The apparent satellite signal 42 can be the satellite signal 14 or a spoofed satellite signal 22. It is further contemplated that both signals 14, 22 are received simultaneously.

The apparent satellite signal 42 can carry the at least two characteristic signatures 24, 34 having two of several characteristics, including but not limited to the power levels 26, 36, either the power level 26 associated with the satellite signal 14, or the power level 36 associated with the spoofed satellite signal 22. It is further contemplated that other data characteristics associated with the apparent satellite signal 42 can also be part of the characteristic signatures 24, 34. The secondary characteristic can include, but is not limited to the satellite location 28 and a satellite time 30. A spoofed location 38 and a spoofed time 40 are also characteristics that can be part of the characteristic signature 34. Upon receiving the apparent satellite signal 42, at 104, the power level 26, 36 and any additional secondary characteristic 28, 30, 38, 40 of the apparent satellite signal 42 are determined, by way of non-limiting example with a computer 45. The computer 45 can be an integrated with the receiving antenna 18 or calculations could be offloaded to a separate computer in the avionics bay in the aircraft or any other location suitable. The computer does not need a fixed location or integration with other systems.

The database 32 can be an onboard database 32a used to store the current transmission data values 24a. The current transmission data values 24a includes the current transmission power level 26a. The current transmission power level 26a can be a known value downloaded prior to departure, by way of non-limiting example before an aircraft takes off while at the gate, and further calculated while in flight based on a predetermined flight path. The current transmission power level 26a can also be uploaded from another receiving source as previously described, through an encrypted safe path. The current transmission value 24a can therefore be a function of the current transmission power level 26.

The current transmission data values 24a can further include a real-time satellite location 28a. Utilizing small perturbation theory, updated satellite locations can be calculated to estimate predicted real-time locations of the satellite 10 in orbit and stored as the real-time satellite location 28a. It is contemplated that the computer 45 can be utilized to execute the small perturbation theory. The method can further include calculating a second difference value 48 when the current transmission data value 24a is based on the predicted or actual real-time satellite locations 28a. Another mathematical calculation contemplated includes dead reckoning where with the assumption that a satellite moves at constant speed in a constant orbit, a prediction is calculated. This would then require frequent updates of actual positions. It should be understood that the real-time satellite locations 28a can be determined in a number of ways and are not limited to those described herein.

The current transmission data values 24a can further include a Global Navigation Satellite System (GNSS) time signal 30a. It is further contemplated that the determining at least two characteristic signatures 24, 34 includes receiving a GNSS time signal as the GNSS time signal 30a from the database 32, directly or indirectly via the onboard database 32a. An onboard clock 50 can be set prior to departure, again by way of non-limiting example before an aircraft takes off while at the gate. The onboard clock 50 can be set to a known real-time. The onboard clock 50 can be, by way of non-limiting example, an atomic clock, and be utilized to determine the GNSS time signal 30a. By way of non-limiting example, the method can further include calculating a third difference value 52 when the current transmission data value 24a is based on time from the onboard clock 50.

The computer 45, can be utilized to compare at 106 at least one of the at least two characteristic signatures 24, 34 to the current transmission data values 24a to define a difference value 44. The difference value 44 may be numerical, binary, or text. The difference value 44 can be compared to the predetermined tolerance value 46. The method can further include calculating the difference value 44 by retrieving current transmission data values 24a based on current transmission power levels 26a from the database 32, directly or indirectly via the onboard database 32a. In the event that the difference value 44 is within the predetermined tolerance value 46, no indication is necessary to be sent to a user interface 50. However, it is not outside the realm of possibilities that signals received that are within the predetermined tolerance value 46 can be labeled as safe or true signals.

Indicating at 108 that the apparent satellite signal 42 is a spoofed satellite signal 22 occurs when the difference value 44 is outside the predetermined tolerance value 46. An indication signal 54 that the apparent satellite signal 42 is a spoofed satellite signal 22 can be generated and delivered to an appropriate user interface 56. The indication signal 54 can be generated, by way of non-limiting example, by the computer 45. By way of non-limiting example, a user reading the user interface 56 can include a pilot or co-pilot of the aircraft or an air traffic controller or both. Any appropriate user or user interface can receive the indication signal 54.

In an exemplary detecting, the satellite signal 14 can have an output power level 23 of 100 W (20 dBW) which can translate to a received characteristic signature 24 power level 26 of 0.0001 pW (−160 dBW) based on free space path loss calculated orbit elevation and aircraft elevation. In the exemplary detecting, the current transmission power level 26a can also be 0.0001 pW (−160 dBW), which can result in a difference value 44 of zero. A predetermined tolerance value 46 can be +/−0.001 pW. If the apparent satellite signal 42 received at the antenna 18 includes a spoofed characteristic signature 34 with a spoofed power level 36 received of 0.1 pW (−130 dBW), the difference value 44 would be ~0.01 pW which is outside the predetermined tolerance value 46 of +/−0.001 W.

A method 100 of detecting the spoofing of the satellite signal 14 from the satellite 10 in orbit is illustrated in a flow chart of FIG. 2. The method includes at 102 receiving by the antenna 18 the apparent satellite signal 42. At 104 determining at least two characteristic signatures 24, 34 of the apparent satellite signal 42 including a power level 26, 36. At 106 comparing the at least two characteristic signatures 24, 34 to the current transmission data values 24a to define a difference value 44. At 108 indicating the apparent satellite signal 42 is a spoofed satellite signal 22 when the difference value 44 is outside a predetermined tolerance value 46.

It is further contemplated that the secondary characteristic 28, 30 as described herein can include waveform generation, which can be a function of the hardware used on the satellite. The spoofing signal source 20 would include different hardware or software than the satellite 10 to create the spoofed satellite signal 22, which would present as a difference value 44 of small deviations in waveforms (e.g. more/less perfect square wave).

It is also contemplated that the secondary characteristic 28, 30 as described herein includes determining the bandwidth utilized by the satellite 10 and/or receiver 18 and how much noise is generated. The difference value 44 would take into account tolerances that include bleed over frequencies. Utilizing noise in conjunction with power levels 26 enable a long time monitoring of the fluctuation in both noise associated with differing bandwidths and the power level 26 emitted over time.

It should be understood that the at least two characteristics as described herein include a power level and any one of the secondary characteristics as described herein. It is also contemplated that the at least two characteristics as described herein can include three or more characteristics.

Benefits associated with the method of detecting the spoofing of the satellite signal described herein enable a pilot to be alerted of possible spoofing. Allowing pilots access to information regarding possible spoofing increases safety and security for the aircraft along with passengers on board. Furthermore a reduction of missed approaches during landing procedures can be a result of an informed pilot. Informed communication with air traffic control in a case of a spoofing attack more quickly enables both pilots and air traffic control workers to communicate with each other and identify and fix any errors in navigation that may occur due to an attempted spoofing attack.

Furthermore, the method as disclosed herein can be implemented and carried out with existing parts on any aircraft, satellite, or structures provided on earth. The cost of implementing the method is therefore less than replacing the existing GNSS infrastructure with cryptographically signed transmissions where each signal is implanted with a digital signature. Proper cryptographic authentication of signals requires hardware and software changes globally. Modifying existing satellites in orbit is difficult. The disclosure herein enables an update for receivers that is "backwards compatible" when improvement in spoofing detection is necessary.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A method for detecting the spoofing of a signal from a satellite in orbit, the method comprising receiving by a receiver an apparent satellite signal; determining at least two characteristic signatures of the signal including a power level and a secondary characteristic; comparing at least one of the at least two characteristic signatures to at least one current transmission data value to define a difference value; and indicating the apparent satellite signal is a spoofed satellite signal when the difference value is outside a predetermined tolerance value.

2. The method of any preceding clause further comprising calculating the difference value by retrieving the at least one current transmission data value based on current transmission power levels of satellites from a database.

3. The method of any preceding clause wherein the determining a secondary characteristic further comprises receiving a real-time location of a satellite.

4. The method of any preceding clause further comprising calculating a second difference value when the at least one current transmission data value is based on a real-time satellite location.

5. The method of any preceding clause wherein the real-time location is one of an actual real-time location or a predicted real-time location.

6. The method of any preceding clause wherein the determining a secondary characteristic further comprises receiving a GNSS time signal.

7. The method of any preceding clause further comprising calculating third difference value when the at least one current transmission data value is based on an time from an onboard clock.

8. The method of any preceding clause further comprising a database comprising a table of current transmission power and a corresponding current real-time location for the satellite.

9. The method of any preceding clause wherein the at least one current transmission data value is a function of the current transmission power level.

10. The method of any preceding clause wherein the at least one current transmission data value is compensated for atmospheric attenuation.

11. The method of any preceding clause wherein the compensation is a function of a corresponding current satellite location.

12. The method of any preceding clause wherein the compensation is a function of a current distance between the satellite and the receiver.

13. The method of any preceding clause further comprising generating an indication signal and delivering the indication signal to a user interface.

14. The method of any preceding clause wherein the determining a secondary characteristic can include determining a waveform or bandwidth.

15. A method for detecting the spoofing of a signal from a satellite in orbit to a receiver on an aircraft, the method comprising receiving by the receiver an apparent satellite signal; determining at least two characteristic signatures of the signal including a power level; comparing the at least one of the two characteristic signatures to a current transmission data value to define a difference value; and indicating the apparent satellite signal is a spoofed satellite signal when the difference value is outside a predetermined tolerance value.

16. The method of any preceding clause wherein the determining at least one reference value further comprises receiving a real-time location of a satellite.

17. The method of any preceding clause further comprising calculating a second difference value when the at least one current transmission data value is based on a real-time satellite location.

18. The method of any preceding clause wherein the determining at least two characteristic signatures value further comprises receiving a GNSS time signal.

19. The method of any preceding clause further comprising calculating a third difference value when the at least one current transmission data value is based on time from an onboard clock.

20. The method of any preceding clause further comprising generating and delivering an indication signal to a user interface.

What is claimed is:

1. A method for detecting the spoofing of a signal from a satellite in orbit, the method comprising:
    receiving by a receiver an apparent satellite-signal;
    determining at least two characteristic signatures of the apparent satellite signal including a power level and a secondary characteristic;
    comparing at least one of the at least two characteristic signatures to at least one current transmission data value to define a difference value;
    confirming that the apparent satellite signal is a true satellite signal when at least one of the characteristic signatures is based on an aircraft elevation and the difference value is within a predetermined tolerance value; and
    indicating that the apparent satellite signal is a spoofed satellite signal when the difference value is outside the predetermined tolerance value.

2. The method of claim 1 further comprising calculating the difference value by retrieving the at least one current transmission data value based on current transmission power levels of satellites from a database.

3. The method of claim 1 wherein the determining a secondary characteristic further comprises receiving a real-time location of a satellite.

4. The method of claim 3 further comprising calculating a second difference value when the at least one current transmission data value is based on a real-time satellite location.

5. The method of claim 4 wherein the real-time location is one of an actual real-time location or a predicted real-time location.

6. The method of claim 1 wherein the determining a secondary characteristic further comprises receiving a GNSS time signal.

7. The method of claim 6 further comprising calculating a third difference value when the at least one current transmission data value is based on a time from an onboard clock.

8. The method of claim 1 further comprising a database comprising a table of a current transmission power level and a corresponding current real-time location for the satellite.

9. The method of claim 8 wherein the at least one current transmission data value is a function of the current transmission power level.

10. The method of claim 9 wherein the at least one current transmission data value is compensated for atmospheric attenuation.

11. The method of claim 10 wherein the compensation is a function of a corresponding current satellite location.

12. The method of claim 11 wherein the compensation is a function of a current distance between the satellite and the receiver.

13. The method of claim 1 further comprising generating an indication signal and delivering the indication signal to a user interface.

14. The method of claim 1 wherein the determining a secondary characteristic can include determining a waveform or bandwidth.

15. A method for detecting the spoofing of a signal from a satellite in orbit to a receiver on an aircraft, the method comprising:
    receiving by the receiver an apparent satellite signal;
    determining at least two characteristic signatures of the signal including a power level;
    compensating for weather conditions when measuring a current transmission data value;
    comparing at least one of the two characteristic signatures to the current transmission data value to define a difference value; and
    indicating the apparent satellite signal is a spoofed satellite signal when the difference value is outside a predetermined tolerance value.

16. The method of claim 15 wherein the determining at least two characteristic signatures further comprises receiving a real-time location of a satellite.

17. The method of claim 16 further comprising calculating a second difference value when the current transmission data value is based on a real-time satellite location.

18. The method of claim 15 wherein the determining at least two characteristic signatures value further comprises receiving a GNSS time signal.

19. The method of claim 18 further comprising calculating a third difference value when the current transmission data value is based on time from an onboard clock.

20. The method of claim 15 further comprising generating and delivering an indication signal to a user interface.

* * * * *